May 8, 1956  R. C. VAUGHAN  2,745,025
MINIATURE ELECTRIC MOTORS
Filed Nov. 27, 1953  3 Sheets-Sheet 1
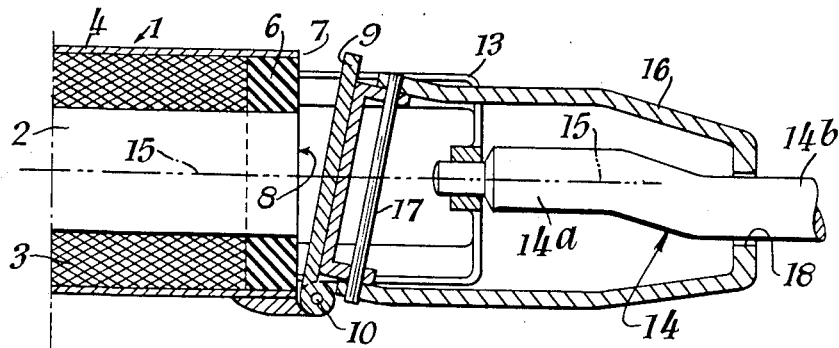
Fig.1.
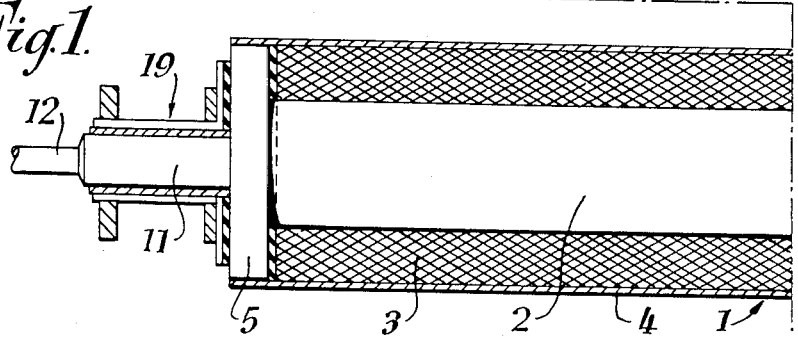
Fig.2.
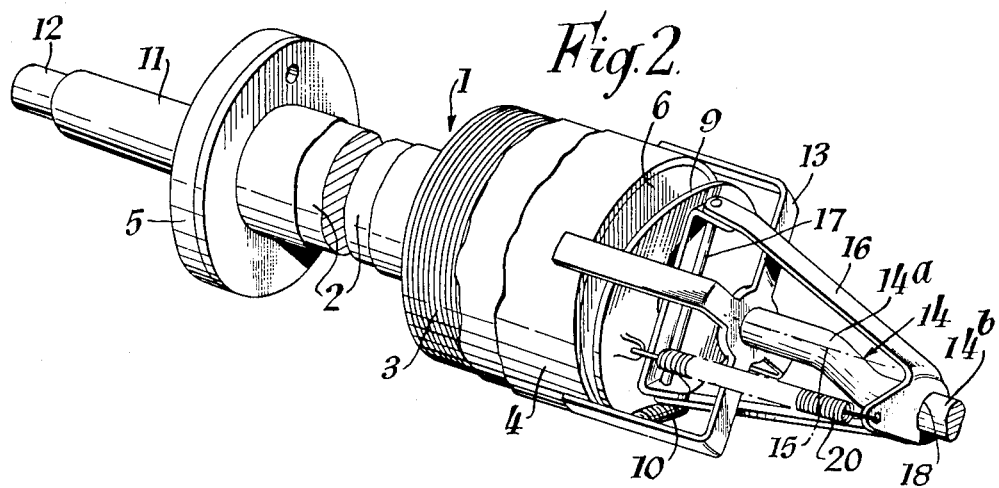
INVENTOR
ROY C. VAUGHAN
BY
ATTORNEY May 8, 1956     R. C. VAUGHAN     2,745,025
MINIATURE ELECTRIC MOTORS
Filed Nov. 27, 1953     3 Sheets-Sheet 2

INVENTOR
ROY C. VAUGHAN
BY
ATTORNEY

May 8, 1956  R. C. VAUGHAN  2,745,025
MINIATURE ELECTRIC MOTORS
Filed Nov. 27, 1953  3 Sheets-Sheet 3
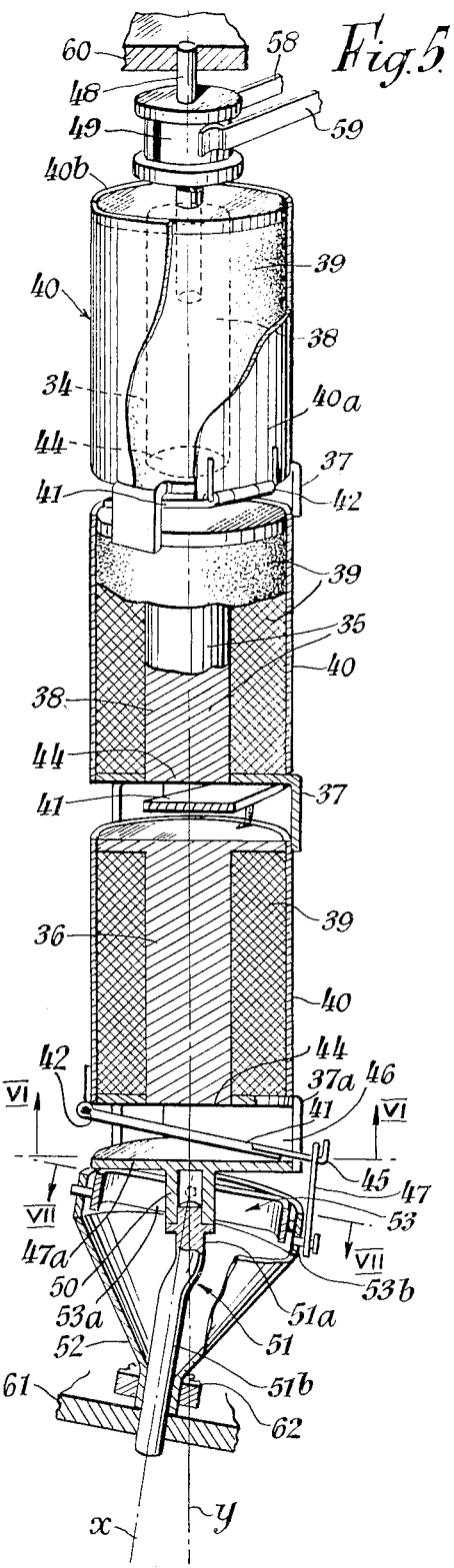
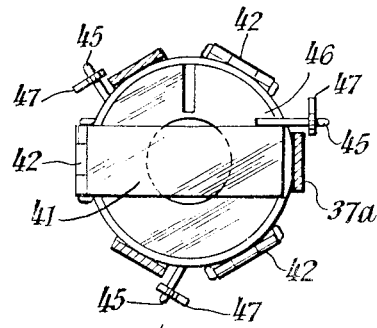
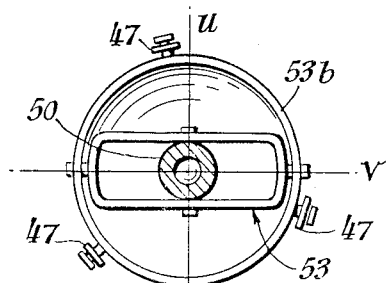
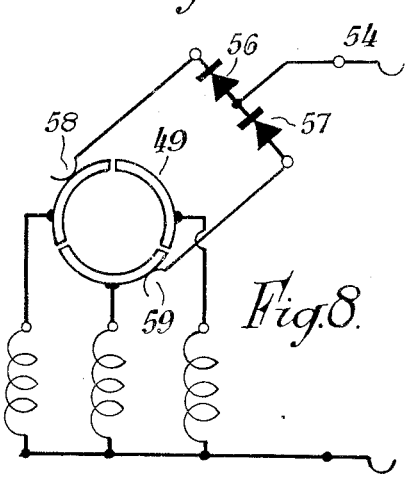
INVENTOR
ROY C. VAUGHAN
BY
ATTORNEY United States Patent Office 2,745,025
Patented May 8, 1956

2,745,025
MINIATURE ELECTRIC MOTORS

Roy C. Vaughan, Teheran, Iran

Application November 27, 1953, Serial No. 394,829

5 Claims. (Cl. 310—22)

This invention relates to miniature electric motors and comprises a new or improved construction which can be made extremely small without loss of effectiveness and is thus suitable for driving very small toy locomotives and for other purposes requiring a motor of exceptionally small size.

The crankshaft type of electric motor is one in which the power is obtained from an oscillatory armature actuating a crankshaft or its equivalent is particularly suitable for very small sizes because it avoids the losses due to movement of inter-acting poles past one another which occur to rotary motors and which becomes excessive when the scale is very small. The oscillatory armature has the further advantage that the minimum gap between armature and magnet can easily be made very small. It is, however, difficult to get the flywheel necessary for a crankshaft motor into a very small space, particularly when the diameter of the space available is small.

The present invention overcomes this difficulty by constructing an electric motor of the crankshaft type so that the magnet and oscillatory armature rotate as a unit relatively to a fixed crank or eccentric, substantially the whole body of the machine being thus used as a flywheel. The magnet may be made in the form of an elongated cylindrical body having a rocking armature mounted on one of its ends, the fixed crankshaft or eccentric being located a short distance from the end of the cylindrical body of the magnet and being coupled to the armature by a rocking lever arm. This construction enables an effective motor to be accommodated in a tubular space having a diameter of about ten millimetres or even as small as six millimetres. A motor can be thus easily accommodated in the boiler of an "000" gauge scale model locomotive made on a scale of two millimetres per foot.

In one form of the invention, the motor has a single driving magnet and armature having an intermittent driving action, and is equipped with a biasing spring to facilitate starting. In a further development of the invention, the motor has a plurality of driving magnets and armatures. This construction gives a more uniform torque, better starting on load and better electrical efficiency, and obviates the need for a biasing spring for starting.

The invention and its subsidiary features will be fully understood from the following more detailed description of two embodiments of the invention illustrated in the accompanying drawings wherein:

Figure 1 is a sectional view of the motor mechanism transversely divided into two parts for convenience.

Figure 2 is a perspective view in which some of the parts of the motor have been broken away.

Figure 5 is a perspective partly-sectional view of a modified form of the invention in which three driving magnets and armatures are used, Figure 6 is the section taken on the lines VI—VI of Figure 5, Figure 7 is the section taken on the lines VII—VII of Figure 5, and Figure 8 is a circuit diagram.

Figure 3:
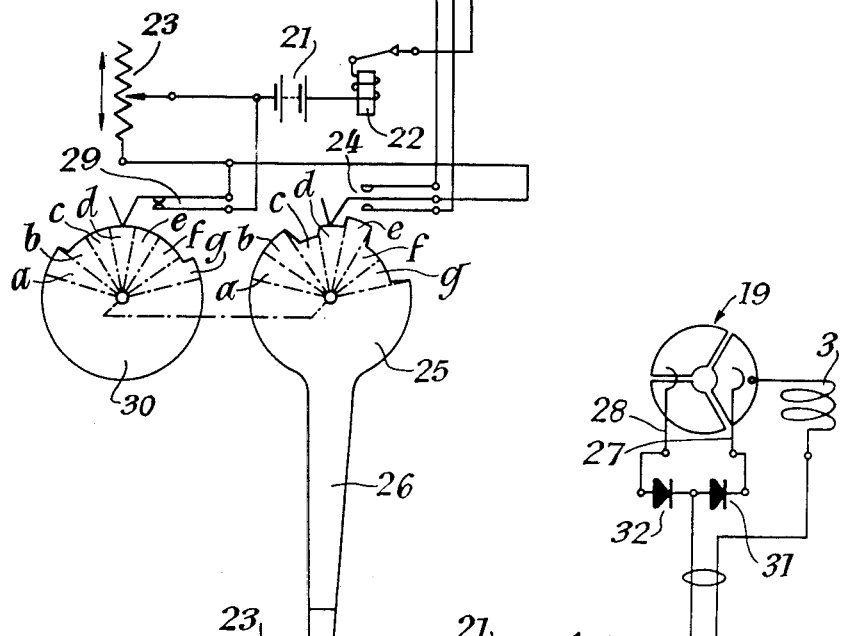
Figures 3 and 4 are diagrams of two forms of control circuit designed to facilitate starting and to provide for remote control of the direction of movement of a locomotive on a model railway.

Referring first to Figures 1 to 4 of the drawings, the main body of the motor shown in these drawings consists of an elongated cylindrical electromagnet indicated generally at 1 in the drawings. This electromagnet has a straight iron core 2 surrounded by a winding 3 enclosed in an iron sleeve 4 one end of which fits on to a part 5 of enlarged diameter formed on the adjacent end of the core 2 for enclosing the magnetic circuit at that end of the winding. At the other end of the winding, the ends of the core and sleeve are spaced apart by an insulating spacing ring 6 so that the extremity of the sleeve 4 at that end forms an annular magnetic pole 7 of opposite polarity to the pole face 8 of the core 2 and separated from it by an annular gap. The two pole faces thus formed are arranged to attract an armature 9 which is attached to the sleeve 4 by a hinge 10 so that it can rock towards or away from the pole face 8 of the magnet.

The core 2 is provided with an axial extension having a part 11 for carrying a commutator and a spindle part 12 of relatively reduced diameter which is adapted to be supported in a main bearing (not shown) of any suitable construction. The spindle part 12 constitutes the power output shaft of the motor and may carry a toothed wheel or other driving element. The end of the magnet body remote from the spindle 12 is supported by a non-ferrous spider 13 attached to the sleeve 4 and rotatably mounted on the end of a fixed crank 14. The crank 14 consists of a length of wire rigidly fixed to any suitable support (not shown) so that the part 14a of the crank (which supports the spider 13) is aligned with the main bearing that supports the spindle 12. The part 14a of the crank thus constitutes a second main bearing and supports the spider 13, magnet body 1 and armature 9 so that they are free to rotate bodily about the common axis of the two main bearings. The part 14b is eccentric to the axis of the main bearings as most plainly shown in Figure 2 where the axis of the main bearing is indicated by the centre line 15. This eccentric part 14b of the crank is the part by which the crank 14 is attached to its support.

The armature 9 is coupled to the crank 14 by a U-shaped non-ferrous lever arm 16 the two limbs of which extend through two of the spaces between the legs of the spider 13 and are attached at their extremities to a pivot pin 17 supported on the armature 9 at right-angles to the pivot axis of the hinge 10. The eccentric part 14b of the crank passes through a loosely fitting hole 18 provided for it in the lever arm 16 at the junction between the two limbs of the lever arm. The construction is such that the action of the eccentric crank part 14b on the lever arm 16 causes the armature 9 to rock about the hinge 10 so that it moves towards and away from the pole face 8 once during each rotation of the magnet body 1. The lever arm 16 also rocks about the pivot pin 17 as the magnet body rotates, but the rocking movement of the lever arm 16 about the pin 17 is phase-displaced by a phase angle of 90° relatively to the rocking movement of the armature 9 owing to the fact that the pin 17 is set at right-angles to the pivot axis of the hinge 10.

The motor is equipped with a commutator indicated generally at 19 in the drawings and arranged to co-operate with a suitable brush (not shown in Figures 1 and 2) to supply current to the winding 3 at appropriate times during the rotation of the magnet body 1 to energise the magnet as the armature 9 moves towards the magnet pole 8 and thus to cause the motor to operate. It has been found that an energising period corresponding to a rotation of 120° gives very satisfactory results and it is therefore convenient to employ a commutator having three segments, the winding 3 being connected at one end to the core 2 and at the other end to one only of the three segments of the commutator, the other segments of the commutator being idle segments. Current is supplied to the two terminals of which one is connected to the core 2 through the frame of the machine and the other is connected to a brush set at a suitable angle according to the direction in which the motor is required to rotate. If the motor is to be reversible, it is provided with two brushes set at 180° to one another, the supply circuit being arranged to supply current to one brush for forward rotation and to the other brush for reverse rotation.

To facilitate starting, the motor is biassed by a spring which constantly tends to move the mechanism towards a position in which the working commutator brush is in contact with the active commutator section (i. e. the commutator section that is connected to the winding). A most convenient method of doing this is by connecting a tension spring 20 at one end to the armature 9 and at the other end to the lever arm 16 as shown in Figure 2, so that the spring 20 constantly tends to rock the lever-arm 16 towards one end of its range of rocking movement. The motor will thus tend to come to rest in a definite position in which the lever arm 16 is at one extremity of its range of movement. As the movement of the armature 9 is 90° out of phase with the movement of the lever arm 16, the armature will normally come to rest midway between its extreme positions and will thus be in the best position to apply torque for starting the motor.

If the motor is provided with two commutator brushes so that it can be run in either direction, the spring 20 is preferably arranged so that it tends to bring the motor to rest in a position in which the active commutator segment is in contact with the brush for forward running. The motor can be made to run in the reverse direction by first supplying a pulse of current to the forward running brush so as to cause the motor to move through about half a turn. This brings the active commutator segment into contact with the reverse running brush and allows the motor to be started in reverse by supplying current to the reverse running brush.

Figure 3 of the drawings illustrates a control circuit for a model railway system in which there are three wires leading through the track from the control circuit to the locomotive. In this circuit one terminal of the battery 21 or other source of current is connected through an automatic overload cut-out 22 and thence through the track and locomotive frame to one end of the motor winding 3. The other current supply terminal is connected through a variable speed-regulating resistance 23 to one terminal of a reversing switch 24 controlled by a lever-operated cam 25. When the control lever 26 is moved to the "off" position, as shown, the reversing switch is open and no current flows to the motor. When the control lever is moved to the extreme forward running position, a segment of the cam profile engages the switch 24 and allows the switch to move to a position in which it completes the motor circuit through a track conductor connected to the forward running brush 27 of the motor. In the opposite extreme position of the lever 26, a segment a of the cam 25 engages the switch 24 and causes it to close the motor supply circuit through the reverse running brush 28 of the motor.

To enable the motor to start in the reverse direction, the cam 25 has a segment c which allows the switch 24 to close the motor circuit in the forward running direction for a brief period during the movement of the control lever from the "off" position to the reverse running position. The control lever 26 is made rather long to encourage deliberate rather than sudden movement of the lever, so that the pulse of current sent through the motor of the lever is sufficient to cause the motor to rotate through about half a turn in the forward direction and thus to bring the active segment of the commutator into contact with the reverse brush 28 to enable the motor to start in the reverse direction. The continued movement of the control lever 26 then causes the switch 24 to close the motor supply circuit through the brush 26 to start the motor in reverse.

As there is a dead-centre position of maximum extension of the spring 20, it sometimes happens that the motor comes to rest in this position. It will then not start in the forward direction because the active segment of the commutator is not in contact with the forward running brush 27 but makes contact with the reverse running brush 28 instead.

To enable the motor to be started in the forward direction on these occasions without any special action on the part of the operator, the cam 25 has a sector e corresponding to the sector c and arranged to close the supply circuit momentarily through the reverse running brush 28 as the lever 26 is moved from the "off" position to the forward running position. If the motor has come to rest with the active commutator segment in contact with the brush 28 as described above, the action of the sector c of the cam causes the motor to receive an impulse in the reverse direction which brings the active segment of the commutator into contact with the brush 27 so that the motor can start in the forward direction. When the motor has stopped in the normal position with the active commutator segment in contact with the brush 27, the sector c of the cam has no effect because there is a break in the circuit between the brush 28 and the active segment of the commutator.

Figure 4:
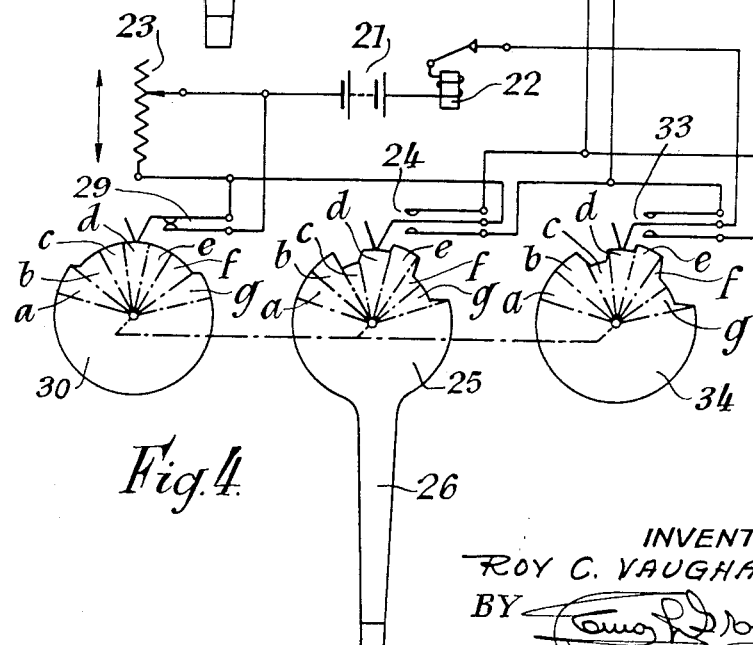

To ensure that the full supply voltage is applied to the motor at starting, the speed regulating resistance 23 is bridged by a switch 29 arranged to short-circuit the resistance except when the control lever 26 is in either of its extreme positions. The switch 29 is controlled by a cam 30 which is coupled to the cam 25 so as to move with it, the profile of the cam 30 being such that the switch 29 opens only when the lever 26 reaches the extreme position for forward running. The cam 25 has sectors b and f which are in effect extensions of the sectors a and g respectively and are arranged so that the final closing of the motor circuit for forward or reverse running is effected by the movement of the lever 26 before the cam 30 opens the short-circuiting switch 29. Figure 4 of the drawings illustrates a modified control circuit which enables the motor to be reversed by reversing the direction of the current supplied to the track, thus enabling a model locomotive to be reversed by remote control when only two wires can be connected to the locomotive through the track. In this circuit the forward and reverse running brushes 27 and 28 are connected to the locomotive to be reversed by remote control when only two wires can be connected to the locomotive through the track. In this circuit the forward and reverse running brushes 27 and 28 are connected to a common wire through two discriminating rectifiers 31 and 32 arranged so that current is supplied to the brush 27 when the current flow is in one direction and is supplied to the brush 28 when the direction of current flow is reversed. The rectifiers 31 and 32 may be small selenium rectifier plates and may be carried in the locomotive tender.

The control circuit shown in Figure 4 is generally similar to that described with reference to Figure 3 but includes an additional switch 33 controlled by an additional cam 34 which moves with the cam 25, the additional switch 33 being wired to the switch 24 as shown so that it co-operates with the switch 24 to supply current of one polarity to the track for moving the locomotive in the forward direction and to supply current of opposite polarity to the track for moving the locomotive in the opposite direction. Apart from the current-commutating action of the switches 24 and 33, the circuit shown in Figure 4 operates in exactly the same way as the circuit shown in Figure 3, and the corresponding elements of the two circuits have been marked with the same reference numerals.

In the modification shown in Figures 5-7 of the drawings, the body of the motor is composed of three magnets 34, 35 and 36 joined end to end and spaced apart by means of two spacers in the form of spiders 37 made of brass or other non-magnetic material. A third spacer 37a similar to the spacers 37 is fixed to the free end of the magnet 36. Each magnet is composed of an iron core 38, a coil 39 machine wound on the iron core, and an iron sleeve 40, the sleeve 40 being made in two parts 40a and 40b which can be easily taken apart and removed from the magnet to enable the coil to be rewound if required. The cores 38 are rigidly fixed to the spacers 37 and 37a and the sleeves 40 are supported on the spacers and held in place when assembled by light soldering or by means of a binding wire.

The three spacers 37 and 37a receive three hinged iron armatures 41 each of which co-operates with one of the three magnets 34, 35 and 36. Each armature is attached by a hinge 42 to the part 40a of one of the iron sleeves 40 and is thus removable with the sleeve 40. When the motor is assembled, however, the armatures 41 project into the spacers through openings 43 provided for them in the walls of the spacers and extend across the poles 44 of the magnet cores 38. At their ends remote from the hinges 42, the armatures carry bent-wire lugs 45 which project through openings 46 in the walls of the spacers and are attached to pull wires 47.

The core 34 at the end of the magnet body remote from the spacer 37a is attached to a spindle 48 which carries a commutator 49 and which is adapted to be supported at its free end in a main bearing 60 of any suitable construction. The other end of the magnet body is supported by a main bearing bush 50 which is formed on the spacer 47a and is rotatably mounted on the end of a fixed crank 51. The crank 51 is adapted to be rigidly fixed to any suitable support 61 so that the part 51a of the crank (which supports the spacer 37a) is aligned with the main bearing 60. The part 51a of the crank 51 thus constitutes a second main bearing and the whole magnet body assembly (including the spacers 37 and 37a, the three cores 38 and coils 39, and the three sleeves 40 and armatures 41) is free to rotate bodily about the common axis of the two main bearings.

The part 51b of the fixed crank is eccentric to the axis of the main bearings and is also inclined to that axis as shown most plainly in Figure 5, the crank being so shaped that the part 51b of the crank lies on an axis x (Figure 1) which intersects the common axis y of the two main bearings at a point near the centre of the bearing bush 50. The part 51b of the crank 51 is the part by which the crank is attached to its support 61.

The pull wires 47 are coupled to the crank 51 by means of a member 52 made in the form of a hollow cone, the smaller end of which is rotatably mounted on the part 51b of the crank, whereas the larger end of the same is supported from the bush 50 by means of a universal coupling indicated generally at 53 in the drawing. This coupling 53 is composed of an inner frame 53a attached to the bearing bush 50 by pivot pins projecting from opposite sides of the bush 50 on an axis u at right-angles to the axis y, and an outer frame or ring 53b attached to the inner frame 53a by pivot pins projecting from opposite sides of the inner frame 53a on an axis v at right-angles to both of the axes y and u. The ring 53b, which is thus supported for universal angular movement relatively to the bush 50, is directly attached to the large diameter end of the cone 52 or it may be formed integrally with the cone. The coupling 53 is designed to transmit rotational movement from the cone 52 to the magnet body assembly and is arranged so that its centre coincides with the point of intersection of the axes $x$ and $y$. It will be seen from this that the cone 52 rotates on its own axis and runs truly on the part 51b of the crank. Thus the cone 52 and the magnet body assembly both rotate truly, each on its own axis, but the ring 53b at the base of the cone has a wobbling movement relatively to the magnet body assembly owing to the fact that its axis of rotation is inclined to that of the magnet body assembly. This relative wobbling movement is utilized to enable a to-and-fro movement imparted to the pull-wires 47 by the armatures 41 to be converted into a rotary movement of the cone 52. For this purpose, each of the pull rods is pivotally attached at one end to a lug 45 on one of the armatures 41 and is pivotally attached at the other end to the ring 53b.

To obtain maximum uniformity of the torque and optimum starting properties, the three armatures 41 are set at 120° to one another about the axis of rotation magnet body and the three pull-wires 47 are attached to the ring 53b at points correspondingly spaced round the axis of rotation of the cone 52. The three armatures are thus arranged to act successively at regular intervals during the rotation of the motor. The commutator 49 has three segments equally spaced apart and each connected at one end to one of the coils 39, the opposite end of each coil being connected to the metallic structure of the rotatable magnet body. This is indicated diagrammatically in Figure 8 of the drawing in which 54 and 55 are the two supply terminals of the motor, the supply terminal 54 being connected through to rectifiers 56 and 57 to two brushes 58 and 59 set at 180° to one another. This circuit arrangement enables the direction of the motor to be reversed by merely reversing the polarity of the current supply, the rectifiers 56 and 57 being connected so that current of one polarity will flow through the bush 58 whereas a current of the opposite polarity will flow through the bush 59. The coils 39 must of course be connected to the segments of the commutator 49 in the correct order, and the angular position of the brushes 58 and 59 must be correctly adjusted to obtain efficient working of the motor as will be readily understood.

The motor shown in Figures 5 to 8 has a driving member in the form of a pinion 62 which is mounted on the smaller end of the cone 52 instead of being mounted on the spindle of the magnet body as in the construction shown in Figures 1 to 4.

A motor constructed as described with reference to Figures 5 to 8 of the drawings may readily be made small enough to fit into a boiler of a toy railway engine of size "00" or "000." For size "00" the motor may have an overall length of thirteen centimetres and an overall width of two centimetres.

The iron cores may be painted with an insulating enamel before winding, and the windings may be protected by covering them with paper insulation before the sleeves 40 are fitted.

The construction described may be used for motors of larger sizes, especially where a motor of long tubular shape is required; and the number of magnets and armatures may be increased if necessary.

I claim:

1. An electric motor comprising rotatable magnets, an oscillatory armature pivoted to one of said magnets, a crankshaft fixed with respect to said rotatable magnets and rotatably mounting one end of said magnets, and linkage means coupled to said armature at one end and loosely mounted around said crankshaft at the opposite end, whereby said armature is oscillated when said magnets are rotated.

2. An electric motor as defined in claim 1, wherein said armature is oscillatable about a hinge carried by said magnet, and wherein said linkage means is pivoted to said armature at right angles with respect to said magnet carried hinge, to thereby provide a phase-displacement by a phase angle of ninety degrees between the rocking movements of said armature and said linkage means.

3. An electric motor as in claim 1, wherein the rotatable unit comprises a number of magnets mounted end to end and each controlling an armature, and wherein the movements of the armatures are transmitted, as by connecting rods, to a ring which rotates at the same speed as a rotatable unit, and which is attached to or forms part of a member mounted to rotate round the fixed crank or eccentric on an axis inclined to the axis of rotation of the rotatable unit so that the ring has a wobbling movement relatively to the rotatable unit.

4. An electric motor as in claim 1, wherein there is a biasing spring connected between said linkage means and said armature, to thereby maintain said mechanism in proper position for producing starting torque.

5. An electric motor as claimed in claim 1, wherein each magnet has an iron core with a coil surrounding the same, and an iron sheath enclosing said coil, said armature serving to complete the magnetic circuit as it is oscillated into contact with the said core and the said sheath.

References Cited in the file of this patent

UNITED STATES PATENTS 1,940,552    Le Page _____ Dec. 19, 1922